(12) United States Patent
Mullin et al.

(10) Patent No.: US 10,156,481 B2
(45) Date of Patent: Dec. 18, 2018

(54) PROBE COVER CONTAINER IDENTIFICATION

(71) Applicant: Welch Allyn, Inc., Skaneateles Falls, NY (US)

(72) Inventors: Matthew D. Mullin, Memphis, NY (US); John A. Lane, Weedsport, NY (US); Craig M. Meyerson, Syracuse, NY (US); David E. Quinn, Auburn, NY (US); Ray D. Stone, Camillus, NY (US); Scott A. Martin, Skaneateles, NY (US)

(73) Assignee: WELCH ALLYN, INC., Skaneateles Falls, NY (US)

( * ) Notice: Subject to any disclaimer, the term of this patent is extended or adjusted under 35 U.S.C. 154(b) by 0 days.

(21) Appl. No.: 15/784,654

(22) Filed: Oct. 16, 2017

(65) Prior Publication Data
US 2018/0038739 A1    Feb. 8, 2018

Related U.S. Application Data

(63) Continuation of application No. 14/074,428, filed on Nov. 7, 2013, now Pat. No. 9,791,325, which is a continuation of application No. 13/365,343, filed on Feb. 3, 2012, now Pat. No. 8,651,736.

(51) Int. Cl.
*G01K 1/08* (2006.01)
*G01J 5/02* (2006.01)
*G01J 5/00* (2006.01)

(52) U.S. Cl.
CPC ............ *G01K 1/083* (2013.01); *G01J 5/0011* (2013.01); *G01J 5/021* (2013.01); *G01J 5/025* (2013.01); *Y10T 29/49* (2015.01)

(58) Field of Classification Search
CPC ... G01K 1/08; G01K 1/083; G01J 5/00; G01J 5/021
USPC .......................... 374/158, 163, 209; 600/184
See application file for complete search history.

(56) References Cited

U.S. PATENT DOCUMENTS

| 3,681,991 A | 8/1972 | Eberly, Jr. |
| 5,201,908 A | 4/1993 | Jones |
| 5,359,991 A | 11/1994 | Takahashi et al. |
| 5,406,939 A | 4/1995 | Bala |

(Continued)

FOREIGN PATENT DOCUMENTS

| EP | 0997718 | 5/2000 |
| JP | 6316060 A | 11/1994 |

(Continued)

OTHER PUBLICATIONS

50 Disposable Probe Covers for Oral Thermometers, httQ://www.safehomeQroducts.com/shQ2/Qroduct/Qiastic-disQosable-oral-tllermometer-Qrobecovers-50/bx/oral-and-probe-covers/631/631 .asox, Viewed: Feb. 27, 2012.

(Continued)

*Primary Examiner* — Gail Kaplan Verbitsky (57) ABSTRACT

A temperature measurement system includes a temperature probe including a temperature sensor. The system also includes a reader, and a controller in communication with the temperature sensor and the reader. The system further includes a container housing a plurality of probe covers associated with the temperature probe. The container includes an information feature providing information related to the plurality of probe covers. The reader is configured to read the information and direct a signal to the controller indicative of the information.

20 Claims, 4 Drawing Sheets

(56) References Cited

U.S. PATENT DOCUMENTS

| | | | |
|---|---|---|---|
| 5,743,849 | A | 4/1998 | Rice et al. |
| 5,902,246 | A | 5/1999 | McHenry et al. |
| 6,026,331 | A | 2/2000 | Feldberg et al. |
| 6,123,454 | A | 9/2000 | Canfield et al. |
| 6,186,959 | B1 | 2/2001 | Canfield et al. |
| 6,537,207 | B1 | 3/2003 | Rice et al. |
| 6,634,789 | B2 | 10/2003 | Babkes |
| 6,827,488 | B2 | 12/2004 | Knieriem et al. |
| 7,032,814 | B2 | 4/2006 | Blankenship |
| 7,871,399 | B2 | 1/2011 | Dacquay et al. |
| 7,887,521 | B2 | 2/2011 | Dacquay et al. |
| 8,051,381 | B2 | 11/2011 | Ebrom et al. |
| 8,058,078 | B2 | 11/2011 | Hansen et al. |
| 8,094,875 | B1 | 1/2012 | Pope et al. |
| 8,651,736 | B2 | 2/2014 | Mullin et al. |
| 9,285,276 | B2 | 3/2016 | Fraden |
| 2004/0231772 | A1 | 11/2004 | Leonard et al. |
| 2005/0249263 | A1 | 11/2005 | Yerlikaya et al. |
| 2007/0100564 | A1 | 5/2007 | Fraden |
| 2007/0167681 | A1 | 7/2007 | Gill et al. |
| 2008/0151695 | A1 | 6/2008 | Kimel et al. |
| 2008/0294065 | A1 | 11/2008 | Waldhoff et al. |
| 2009/0250514 | A1 | 10/2009 | Wilds |
| 2010/0017163 | A1 | 1/2010 | Yamaguchi et al. |
| 2010/0147720 | A1 | 6/2010 | Li |
| 2011/0148651 | A1 | 6/2011 | Hendrickson et al. |
| 2011/0202481 | A1 | 8/2011 | Lang et al. |
| 2011/0257521 | A1 | 10/2011 | Fraden |
| 2012/0059704 | A1 | 3/2012 | Yanagi |
| 2012/0084276 | A1 | 4/2012 | Heimendinger |
| 2012/0128240 | A1 | 5/2012 | Rothschild |
| 2013/0128926 | A1 | 5/2013 | Fraden |
| 2013/0245488 | A1 | 9/2013 | Quinn et al. |
| 2013/0326872 | A1 | 12/2013 | Harr et al. |
| 2014/0064331 | A1 | 3/2014 | Mullin et al. |

FOREIGN PATENT DOCUMENTS

| | | |
|---|---|---|
| JP | 2000041955 A | 2/2000 |
| JP | 2000102512 A | 4/2000 |
| WO | WO2006/126194 A1 | 11/2006 |
| WO | WO2006126194 | 11/2006 |
| WO | WO2007096191 A1 | 8/2007 |
| WO | WO2008130386 A1 | 10/2008 |
| WO | WO2010014543 | 2/2010 |

OTHER PUBLICATIONS

Catarinucci, L., Sensor data transmission through passive RFID tags to feed wireless sensor networks, Microwave Symposium Digest (MTT), 2010 IEEE MTT-S International, Date of Conference: May 23-28, 2010 (2 pgs.) http://ieeexplore.ieee.org/xpl/articleDetails.jsp?arnumber=5515721.

The European Office Action dated Oct. 7, 2016 for European patent application No. 13742934.6, a counterpart foreign application of U.S. Pat. No. 8,651,736, 4 pages.

The Extended European Search Report dated Sep. 22, 2015 for European patent application No. 13742934.6, 7 pages.

Kumar et al., Stage implementation of RFID in hospitals, Journal Technology and Health Care, vol. 18, No. 1/ 2010, pp. 31-46.

Morozov et al., Digital Identifier of Products, CAD Systems in Microelectronics, 2003, CADSM 2003, ProceedinQs of the ih International Conference, Feb. 18-22, 2003 (2 pgs.).

Office action for U.S. Appl. No. 14/074,428, dated Mar. 31, 2017, Mullin et al., "Probe Cover Container Identification", 14 pages.

Office action for U.S. Appl. No. 14/074,428, dated Jun. 30, 2016, Mullin et al., "Probe Cover Container Identification", 8 pages.

Office action for U.S. Appl. No. 14/074,428, dated Sep. 16, 2016, Mullin et al., "Probe Cover Container Identification", 9 pages.

International Search Report and Written Opinion for International Application No. PCT/US2013/023531 dated May 24, 2013 (9 pgs.)

Timex Disposable Probe Covers for Digital Thermometers—Box of 30, http://www.safehomeproducts.com/shp2/product/timex-oral-thermometers-disposable-probecovers-30/oral-and-probe-covers/664/664.asox, Viewed: Feb. 27, 2012.

Zafar, M.F., A comparison of two different proposed feature sets for trademark recognition using neural network, Multi Topic Conference, 2001, IEEE INM IC 2001, Technology for the 21 sl century (2 pgs.) http://ieeexplore.ieee.org/xpl/login.jsp?tp=&arnumber=995350&url=http%3A%2F%2Fieeexplore.ieee.org%2Fiel5%2F7812%2F21468%2F00995350.

PROBE COVER CONTAINER IDENTIFICATION

CROSS-REFERENCE TO RELATED APPLICATION

This application is a continuation of U.S. patent application Ser. No. 14/074,428, filed Nov. 7, 2013, which is a continuation of U.S. patent application Ser. No. 13/365,343, filed Feb. 3, 2012, now U.S. Pat. No. 8,651,736. The entire disclosures of each of the above applications are incorporated herein by reference.

FIELD OF THE INVENTION

The present disclosure relates to systems and methods for temperature determination and, in particular, to systems and methods for determining a patient's core temperature.

BACKGROUND OF THE INVENTION

Measuring patient temperature is a common first step in diagnosing illnesses. Physicians commonly use a variety of methods for determining patient temperature including, for example, obtaining temperature measurements with a thermometer. While thermometers utilizing mercury have been in existence for many years, modern thermometers typically employ one or more electronic sensors configured to measure patient temperature. Such sensors may take one or more measurements over a relatively short period of time. Based on these measurements, the thermometer may generate an estimated internal and/or core temperature of the patient. In generating this estimated core temperature, it is common practice to insert at least a portion of the thermometer into a cover prior to taking temperature measurements. The cover may overlay the electronic temperature sensor of the thermometer, and may protect the sensor from contamination during use.

Determining a patient's core temperature in this way may, however, produce inaccurate results. For example, due to the inherent variability in the processes used to manufacture such covers, each individual cover utilized with such thermometers often has a unique thickness, transmissivity, and/or other physical characteristics. Additionally, covers produced by different manufacturers may have different material compositions, dimensions, and/or other physical characteristics. Such variability can affect the temperature measurements taken by thermometers using such covers, and can be a significant source of error. In an effort to minimize the effect of such error, modern thermometers may utilize algorithms that make predetermined estimates of the variations in the physical properties of such covers. Such estimates, however, may introduce additional error into the patient temperature determination, thereby reducing the accuracy of such determinations.

The exemplary embodiments of the present disclosure are directed toward overcoming the deficiencies described above.

SUMMARY

In an exemplary embodiment of the present disclosure, a temperature measurement system includes a temperature probe including a temperature sensor. The system also includes a reader, and a controller in communication with the temperature sensor and the reader. The system further includes a container housing a plurality of probe covers associated with the temperature probe. The container includes an information feature providing information related to the plurality of probe covers. The reader is configured to read the information and direct a signal to the controller indicative of the information.

In an exemplary embodiment of the present disclosure, a method of determining a temperature of a patient includes reading information related to a plurality of probe covers stored within a container, mounting a probe cover of the plurality of probe covers onto a temperature probe while the probe cover is disposed substantially within the container, and measuring a temperature of the patient with a temperature sensor of the probe. The method also includes estimating a core temperature of the patient based on the measured temperature and the information. In such a method, the information is read with a reader separate from the temperature sensor.

In another exemplary embodiment of the present disclosure, a method of determining a temperature of a patient includes accessing a top-most probe cover of a plurality of probe covers disposed within a container, and mounting the top-most probe cover onto a portion of a temperature probe, wherein the mounted top-most probe cover overlays a temperature sensor of the temperature probe. Such a method also includes reading information indicative of the plurality of probe covers with a reader in communication with the temperature probe, wherein the information is read from the container. Such a method further includes measuring a temperature of the patient with a temperature sensor of the temperature probe, and estimating a core temperature of the patient based on the measured temperature and the information.

DETAILED DESCRIPTION

Figure 1:
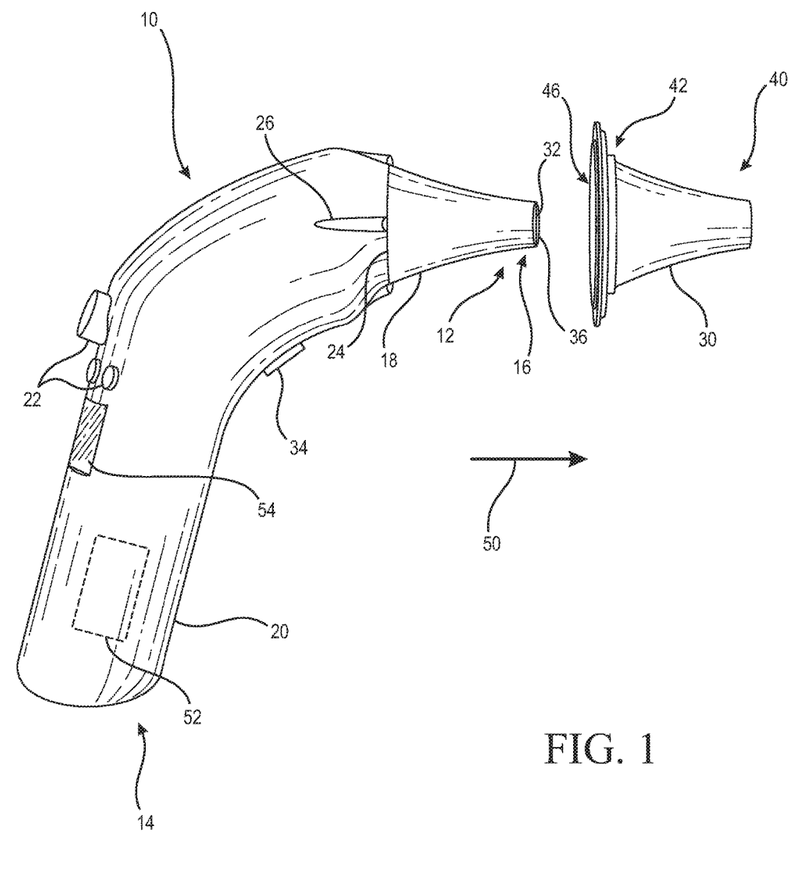
FIG. 1 illustrates a temperature probe according to an exemplary embodiment of the present disclosure.

FIG. 1 illustrates an exemplary temperature probe 10 of the present disclosure. The temperature probe 10 may include, for example, a head 18 connected to a handle 20. The head 18 may define a distal end 12 of the temperature probe 10, and the handle 20 may define a proximal end 14 of the probe 10. The head 18 may include an atraumatic tip 16 disposed at the distal end 12. The tip 16 may be sufficiently rounded and/or otherwise configured so as not to cause injury to a patient upon contact with a body surface or at least partial insertion of the head 18 within one or more body cavities of the patient. In an exemplary embodiment in which the temperature probe 10 is utilized to measure, calculate, estimate and/or otherwise determine a core temperature of the patient, it is understood that such body cavities may include the ear, mouth, rectum, underarm, and/or other known body cavities from which it is convenient to sense temperature. It is understood that the implementation of the disclosed technology in a temperature probe 10 is merely exemplary. The disclosed technology may be applicable to any other medical device that may use a cover, sheath, and/or other structure to protect the device from contaminants present on a surface or in a cavity of the body. Such medical devices may include, for example, probes, endoscopes, speculums, and/or other like devices where the characteristics of the cover/sheath impact the accuracy or precision of data gathered or measurements taken by the medical device.

The head 18 and/or the handle 20 may be made from any material and/or combinations of materials commonly used in medical and/or examination procedures. Such materials may include, for example, plastics, polymers, composites, stainless steel, and/or any other like materials. Such materials may be suitable for repeated use and/or repeated sanitation. Accordingly, in an exemplary embodiment of the present disclosure, the temperature probe 10 and/or its components may be substantially waterproof. One or more waterproof seals may be included and/or otherwise utilized with components of the probe 10 to facilitate such repeated sanitation and/or use.

The handle 20 may include one or more operator interfaces 22. Such operator interfaces 22 may be configured to assist in performing one or more functions of the temperature probe 10. For example, the operator interfaces 22 may comprise any combination of switches, buttons, levers, knobs, dials, keys, and/or other like components configured to activate, deactivate, manipulate, and/or otherwise control components of the temperature probe 10. Such operator interfaces 22 may, for example, assist the user in toggling through and/or selecting one or more modes of operation of the temperature probe 10, enabling and/or disabling one or more alarms or signals associated with operation of the probe 10, initiating a single substantially instantaneous temperature calculation, initiating a substantially continuous and/or repeating temperature calculation, and/or other like modes, functions, or operations.

In an exemplary embodiment, at least one of the operator interfaces 22 may be operably connected to an ejector mechanism 26 disposed proximate a base 24 of the head 18. At least a portion of the temperature probe 10 may be inserted into a probe cover 30 before and/or during use, and such an ejector mechanism 26 may be configured to assist in removing the probe cover 30 from the temperature probe 10. For example, the ejector mechanism 26 may comprise one or more fingers, hooks, shoulders, arms, tabs, and/or other like structures configured to assist in ejecting the probe cover 30 from the base 24 of the head 18 after use. In an exemplary embodiment, one or more such ejector mechanisms 26 may be movable with respect to the base 24 and/or the head 18. In such exemplary embodiments, the ejector mechanisms 26 may be movable in, for example, a path substantially parallel to an axis of the head 18. In additional exemplary embodiments, the ejector mechanisms 26 may be movable in an arcuate path relative to the head 18. Movement of the ejector mechanisms 26 may assist in bending, flexing, and/or otherwise deforming at least a portion of the probe cover 30. For example, the ejector mechanisms 26 may be movable along one or more surfaces of the probe cover 30, and such movement may assist in flexing at least a portion of the probe cover 30. Such flexing may ultimately overcome a retention force provided by one or more retention components (not shown) of the temperature probe 10 and/or the probe cover 30, thereby releasing the probe cover 30 from the temperature probe 10.

In additional exemplary embodiments, one or more operator interfaces 22 may be configured to assist in controlling one or more corresponding sensors associated with the temperature probe 10. For example, the operator interfaces 22 may be operably connected to and/or otherwise in communication with first and second sensors 32, 34. In exemplary embodiments, the first and second sensors 32, 34 may be embedded within and/or otherwise formed integrally with the head 18 and/or the handle 20. In such exemplary embodiments, it is understood that the sensors 32, 34 may be electrically, operably, and/or otherwise connected to the operator interfaces 22 and/or other components of the temperature probe 10 via known electrical or wireless connections. As will be described in greater detail below, the sensors 32, 34 may be operably, controllably, electrically, wirelessly, and/or otherwise connected to and/or in communication with a controller 52. In such an exemplary embodiment, the controller 52 may be configured to assist in estimating a core temperature of a patient based on signals and/or other input from the first and second sensors 32, 34. In further exemplary embodiments, one or more of the sensors 32, 34 may be in communication with the temperature probe 10 and/or the controller 52 via WiFi, Bluetooth, and/or any other known wireless connection.

In an exemplary embodiment, one or more of the sensors 32, 34 may comprise any type of temperature sensor known in the art. For example, the sensors 32, 34 may be the same type of sensor. Alternatively, the sensors 32, 34 may comprise different types of sensors configured to sense one or more different characteristics of a patient. In an exemplary embodiment, at least one of the first and second sensors 32, 34 may comprise a temperature sensor, such as a thermocouple and/or a thermistor, configured to sense a temperature associated with the patient. For example, such a sensor may be configured to sense a temperature of the body cavity into which the temperature probe 10 has been inserted. For example, in embodiments in which the head 18 of the temperature probe 10 is inserted into the ear of the patient, such a sensor may be utilized to sense a temperature associated with the tympanic membrane of the patient.

In an additional exemplary embodiment, at least one of the sensors 32, 34 may comprise an infrared temperature sensor such as, for example, a thermopile and/or other like infrared-based temperature sensing components. Such a sensor may be configured to convert thermal energy into electrical energy, and may comprise two or more thermocouples connected in series or in parallel. Such components may be configured to generate an output voltage proportional to a local temperature difference and/or temperature gradient. In an exemplary embodiment in which the one or more of the sensors 32, 34 comprises a thermopile, the temperature probe 10 may comprise, for example, an infrared temperature probe and/or other like infrared thermometer.

In another exemplary embodiment, at least one of the sensors 32, 34 may comprise a reader such as, for example, an RFID reader, a barcode reader, an MICR reader, a conductance sensor, a resistance sensor, a magnetic sensor, and/or any other like reading device known in the art. Such a reader may be configured to sense, scan, detect, and/or otherwise read information carried by one or more information features 28 associated with the storage container 58. In addition to standard text, such information features 28 may comprise one of an RFID tag, a barcode, MICR printing, a conductive, resistive, and/or magnetic strip of material, and/or other known means for providing information. The reader may further comprise one or more cameras, scopes, optical devices, and/or other like components configured to read information from the information feature 28. In such exemplary embodiments, the reader and/or the controller 52 may employ various pattern recognition software, identification software, and/or other like control hardware/software to assist in reading the information provided by the information feature 28. As shown in FIG. 1, in an exemplary embodiment the reader 34 may be disposed on the temperature probe 10 and/or formed integrally with the temperature probe 10 proximal to the temperature sensor 36.

Figure 4:
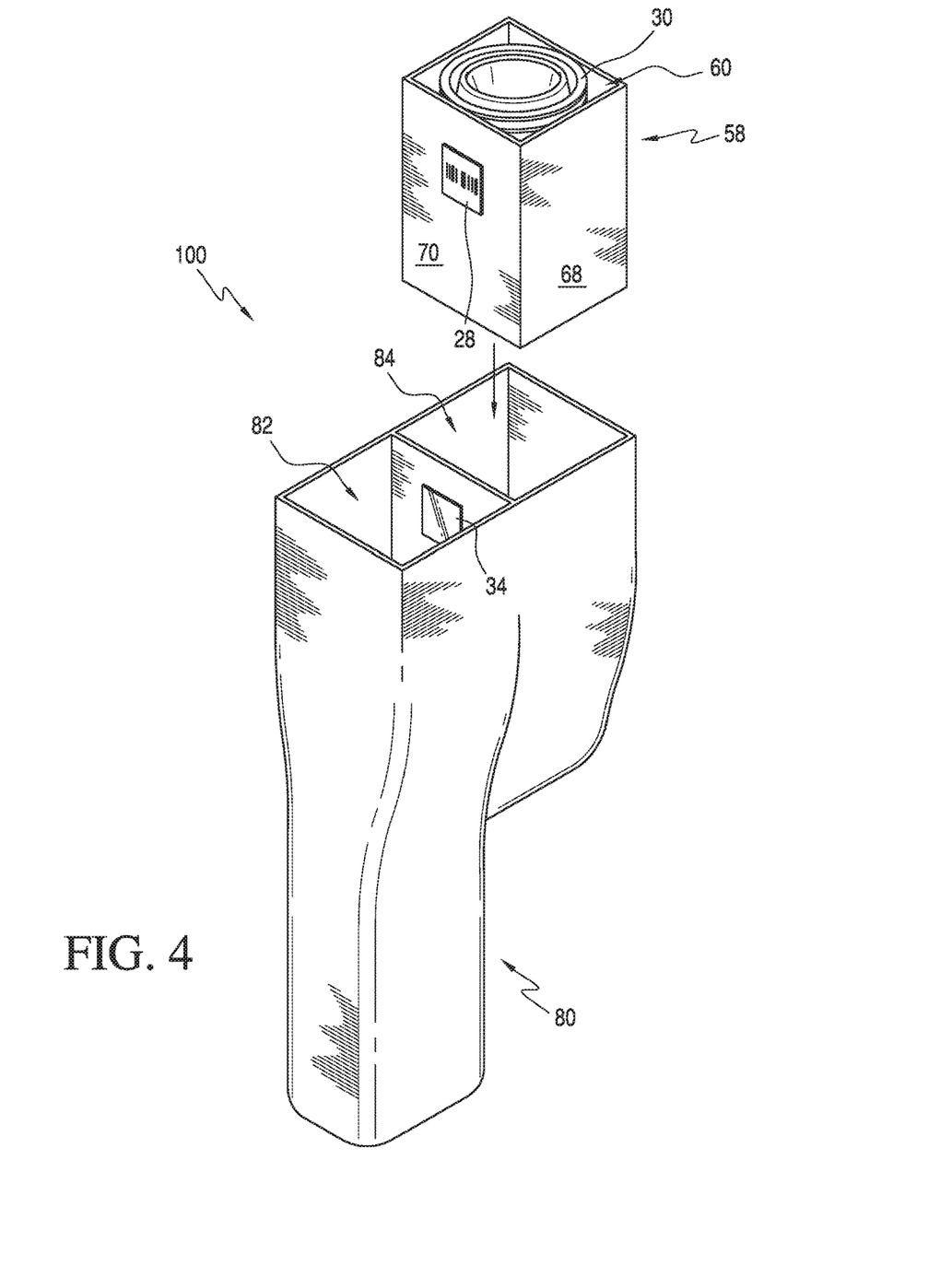
FIG. 4 illustrates a portion of a temperature measurement system according to another exemplary embodiment of the present disclosure.

As shown in FIG. 4, in further exemplary embodiments, the temperature measurement system 100 may include a receptacle 80 configured to retain at least one of the storage container 58 and the temperature probe 10. For example, the receptacle 80 may include a first compartment 82 sized, shaped, and/or otherwise configured to retain and/or store at least a portion of the temperature probe 10 therein. The receptacle 80 may also include a second compartment 84 sized, shaped, and/or otherwise configured to retain and/or store at least a portion of the storage container 58 therein. Alternatively, the temperature probe 10 and the storage container 58 may be retained and/or stored within a single compartment of the receptacle 80. The compartments of the receptacle 80 may include, for example, one or more openings configured to facilitate repeated insertion and/or removal of the temperature probe 10 and the storage container 58, respectively.

In an exemplary embodiment, the sensor 34 may be disposed on the receptacle 80 at any location convenient for reading information from the information feature 28 when the information feature 28 is disposed proximate the sensor 34. For example, the sensor 34 may be disposed on or in one of the compartments 82, 84. In such exemplary embodiments, the sensor 34 may be positioned to read information from the information feature 28 during at least one of insertion of the storage container 58 into the receptacle 80 and removal of the temperature probe 10 from the receptacle 80. In exemplary embodiments in which the sensor 34 is disposed within the second compartment 84, the information feature 28 may be disposed substantially adjacent to the sensor 34 and/or at least partially within a sensing range 74 (described in greater detail below with respect to FIG. 2) of the sensor 34 when the storage container 58 is disposed within the second compartment 84.

Likewise, in exemplary embodiments in which the sensor 34 is disposed within the first compartment 82, the information feature 28 may be disposed proximate the sensor 34 and/or at least partially within the sensing range 74 of the sensor 34 when the storage container 58 is disposed within the second compartment 84. In such an additional exemplary embodiment, a portion of the first and/or second compartment 82, 84 may be removed to facilitate reading of the information by the sensor 34. Alternatively, at least one of the first and second compartments 82, 84 may include a substantially transparent window (not shown), lens, or other like optical component (described in greater detail below) to facilitate reading of the information by the sensor 34 disposed in the first compartment 82.

In such exemplary embodiments, the sensor 34, temperature probe 10, receptacle 80, and/or the controller 52 may include and/or be in communication with a proximity sensor (not shown). Such a proximity sensor may detect insertion of the storage container 58 into the receptacle 80 and/or removal of the storage container 58 from the receptacle 80. Such a proximity sensor may also detect insertion of the temperature probe 10 into the receptacle 80 and/or removal of the storage container 58 from the receptacle 80. The proximity sensor may be configured to direct a signal to the controller 52 indicative of such insertion and/or removal, and the sensor 34 may be configured to read information from the information feature 28 in response to such a signal and/or in response to a related command signal received from the controller 52. In the exemplary embodiment illustrated in FIG. 4, the sensor 34 may be configured to read the information from the information feature 28 prior to and/or during each temperature measurement performed by the sensor 36.

In exemplary embodiments, the sensor 34 may be configured to read the information and direct a signal to the controller 52 indicative of the information. The controller 52 may utilize the received information for any number of known functions. For example, the controller 52 may be configured to estimate a core temperature of the patient based on the information. The controller 52 may also be configured to deactivate the temperature probe 10, and/or components thereof, in response to the information. For example, the controller 52 may be configured to deactivate one or both of the sensors 32, 34 in response to the information. Such control strategies will be discussed in greater detail below.

In a further embodiment, an exemplary infrared temperature probe 10 may utilize at least a portion of the thermal radiation emitted by the patient and/or the body cavity of the patient into which the temperature probe 10 has been inserted in order to estimate, infer, calculate, and/or otherwise determine a core temperature of the patient. Such an exemplary temperature probe 10 may utilize signals received by at least one of the first and second sensors 32, 34 to determine an amount of infrared radiation emitted by the patient. Using a known transmissivity and/or other characteristic of the patient, such infrared temperature probes 10 may be capable of estimating a core temperature of the patient.

At least one of the sensors 32, 34 may additionally include at least one window, lens, and/or other like optical component 36 positioned proximate thereto. For example, such an optical component 36 may be disposed substantially flush and/or coplanar with the outer surface of the head 18. Such optical components 36 may be disposed, for example, at the tip 16 of the temperature probe 10, and may be configured to assist in, for example, focusing and/or transmitting infrared radiation between the thermopile and the body cavity of the patient. Such optical components 36 may also assist in protecting the thermopile, thermocouple, thermistor, and/or other sensor components during use of the temperature probe 10, and may assist in forming a substantially fluid tight compartment within the head 18 so as to protect sensor components from contact with bodily fluids, cleaning solutions, and/or other liquids. It is understood that such optical components 36 may be substantially transparent to assist in the transmission of infrared and/or other types of radiation.

The handle 20 may also include one or more displays 54 operably connected to the controller 52. The display 54 may comprise, for example, a liquid crystal display (LCD) screen, a light emitting diode (LED) display, a digital read-out, and/or any other like components configured to communicate information to the user of the temperature probe 10. Such displays 54 may be configured to indicate, for example, one or more temperatures sensed by the sensor 32, information read by the sensor 34, one or more temperatures calculated based on signals received from the one or more sensors 32, 34, and/or any other information that may be useful during operation of the temperature probe 10.

The display 54 may be configured to communicate such information substantially instantaneously and/or substantially continuously depending on the mode of operation of the temperature probe 10. Such a display 54 may also indicate whether or not the temperature probe 10 is turned on, and whether a probe cover 30 has been connected to the temperature probe 10. The display 54 may also be configured to indicate the mode of operation of the temperature probe 10 (for example, continuous or instantaneous modes of temperature calculation), as well as whether one or more threshold temperatures, threshold temperature change rates, and/or other sensed metric thresholds have been met or exceeded. The display 54 may be, for example, a substantially numerical digital display, and may also be configured to display any other typical operating information such as, for example a temperature vs. time trend line or other graphical depictions.

The temperature probe 10 may also include one or more signal devices (not shown) operably connected to the controller 52. Such signal devices may include, for example, one or more lights, LEDs, speakers, and/or other like devices configured to emit an audible and/or optical alarm or signal in response to a command or signal from the controller 52. Such an alarm or other signal may be initiated by, for example, the controller 52 when the calculated temperature meets or exceeds a threshold temperature. In additional exemplary embodiments, such an alarm or signal may be initiated during a substantially continuous temperature calculation operation where the rate of patient temperature change meets or exceeds a predetermined temperature change rate threshold.

The controller 52 may be operably connected to and/or otherwise in communication with the operator interfaces 22, display 54, sensors 32, 34, and/or other components of the temperature probe 10, and the controller 52 may be configured to control the operation of such components. In an exemplary embodiment, the controller 52 may be configured to receive signals, information, measurements, and/or other data from the first and second sensors 32, 34, and to calculate an estimated core temperature of the patient based on the information received. The controller 52 may also be configured to execute one or more commands and/or control programs. For example, the controller 52 may be programmed to initiate one or more alarms in response to calculating a patient temperature that is greater than or equal to a predetermined threshold temperature. In an exemplary embodiment, such a threshold temperature may be approximately 100° F. In addition, the controller 52 may be configured to initiate such an alarm during a substantially continuous temperature calculation operation if the calculated temperature increases and/or decreases at a rate that is greater than or equal to a predetermined threshold temperature change rate.

The controller 52 may comprise a processor, memory, and/or other known controller components to facilitate the functionality described herein. In an exemplary embodiment, the controller 52 may be disposed within, for example, the handle 20 of the temperature probe 10. In such an embodiment, the handle 20 may form one or more substantially water-tight and/or substantially hermetically sealed compartments for storing the various components of the controller 52.

The probe cover 30 may be substantially conical, substantially cylindrical, and/or any other convenient shape for sensing the temperature of a patient, and the probe cover 30 may have similar dimensions to that of the head 18. For example, the probe cover 30 may be incrementally longer than the head 18 so as to fit over substantially the entire head 18. When mounted on the head 18, the probe cover 30 may overlay the sensor 32 disposed at the tip 16, however, the sensor 34 may be disposed proximal to the mounted probe cover 30. The probe cover 30 may define an orifice 46 at a proximal end 42 thereof. Similar to the head 18, the probe cover 30 may also define a substantially atraumatic tip at a distal end 40 thereof. The probe cover 30 may be formed from any medically approved material known in the art. Such materials may include, for example, plastics, polymers, and/or any of the other materials discussed above with regard to the temperature probe 10. Using such materials may enable, for example, the probe cover 30 to be repeatedly used and/or sanitized.

Such materials may also facilitate formation of the probe cover 30 through any molding, extrusion, and/or other like process known in the art. Such materials and/or processes may enable the probe cover 30 to be formed with any desirable transmissivity, thickness, dimensions, and/or other configurations. For example, multiple probe covers 30 of the present disclosure may be formed at the same time though the processes discussed above, and each batch or lot of probe covers 30 may be formed with substantially the same transmissivity, thickness, dimensions, and/or other configurations. Although it may be desirable for the probe covers 30 formed in each lot to have identical configurations, such repeatability within the lot may not be possible due to variations and/or imperfections inherent in the above manufacturing processes. Accordingly, the transmissivity, thickness, dimensions, and/or other configurations of the probe covers 30 in each lot may be substantially identical within a desired tolerance range.

In additional exemplary embodiments, the probe cover 30 may include one or more additional structures to facilitate usage with, insertion on, and/or removal from the temperature probe 10. For example, while the orifice 46 may be shaped, sized, and/or otherwise configured to accept the head 18 and to mate with one or more ejector mechanisms 26 of the temperature probe 10, in further exemplary embodiments, at least a portion of the proximal end 42 of the probe cover 30 may include additional notches, cutouts, tabs, ribs, flanges, and/or other retention components configured to assist in connecting the probe cover 30 to and/or disconnecting the probe cover 30 from the temperature probe 10. For example, such retention components may mate with the ejector mechanisms 26 of the temperature probe 10 to facilitate retention of the probe cover 30 on the head 18 and/or ejection of the probe cover 30 from the head 18. Once the probe cover 30 has been connected to the temperature probe 10, such retention components may assist in providing a retention force sufficient to maintain the connection between the probe cover 30 and the temperature probe 10. An exemplary retention force may be a compression force applied by, for example, a rib of the probe cover 30 to one or more tabs proximate the base 24 of the head 18.

Such retention components of the probe cover 30 may also include, for example, one or more camming surfaces positioned such that the ejector mechanism 26 is able to ride along the one or more camming surfaces in substantially the direction of arrow 50. Such movement of the ejector mechanism 26 may assist in bending and/or otherwise flexing a portion of the probe cover 30. The force applied by the ejector mechanism 26 to the one or more camming surfaces of the probe cover 30 may be sufficient to overcome the retention force provided by the retention components, and as a result, the probe cover 30 may be ejected from the head 18.

Figure 2:
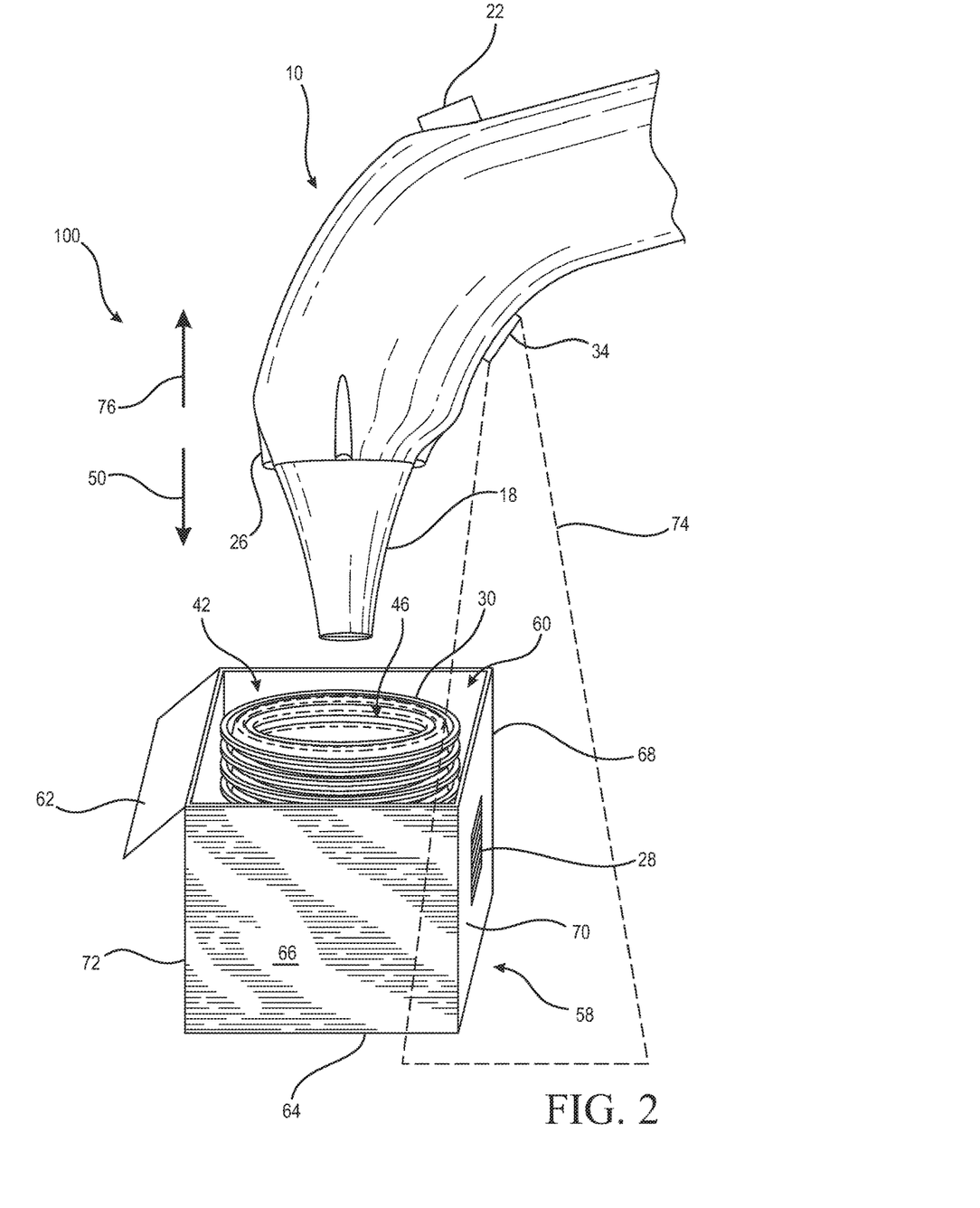
FIG. 2 illustrates a portion of a temperature measurement system according to an exemplary embodiment of the present disclosure.

As shown in FIGS. 2 and 4, and as mentioned above, an exemplary temperature measurement system 100 of the present disclosure may include a storage container 58 and one or more probe covers 30 disposed within the storage container 58. Such exemplary temperature measurement systems 100 may also include the receptacle, 80, the temperature probe 10, and/or any components thereof. The storage container 58 may have any shape, size, and/or other configuration convenient for storing a plurality of probe covers 30 therein. For example, the storage container 58 may be substantially box shaped, and may have a substantially rectangular, substantially cylindrical, substantially square, and/or substantially hexagonal cross-sectional shape.

Figure 3:
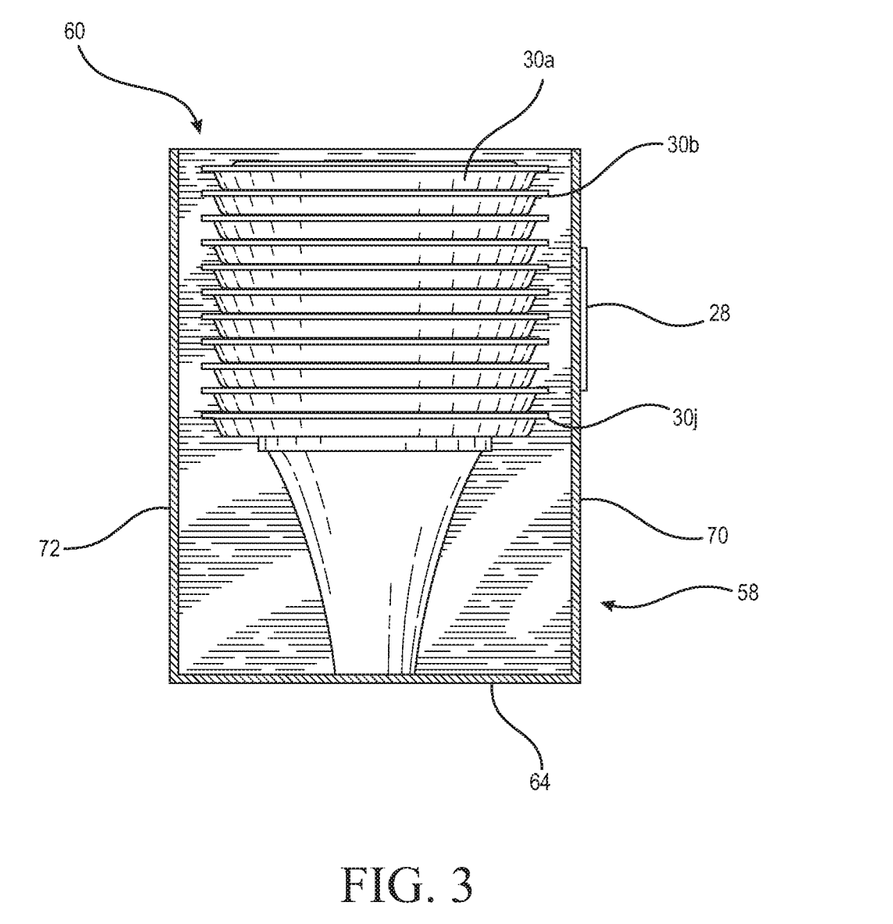
FIG. 3 is a cut away pictorial view of an exemplary storage container of the present disclosure.

At least a portion of the storage container 58 may define one or more openings 60. Such exemplary openings 60 may be shaped, sized, located, and/or otherwise configured to assist in the removal of one or more probe covers 30 from the storage container 58. For example, such an opening 60 may be shaped and/or sized to permit passage of a probe cover 30 for removal of the probe cover 30 from the storage container 58. Such an opening 60 may also be shaped and/or sized to permit removal of only a single probe cover 30 from the storage container 58 at one time. In such an exemplary embodiment, the opening 60 may assist in retaining the remaining probe covers 30 within the storage container 58 while, at the same time, facilitating removal of a single probe cover 30 for use with the temperature probe 10. For example, two or more probe covers 30 may be stacked on top of one another within the storage container 58. An exemplary stacked arrangement is illustrated in FIG. 3. In such an arrangement, at least a portion of a top-most probe cover 30a may be disposed within an adjacent probe cover 30b. In such an embodiment, the opening 60 of the storage container 58 may facilitate removal of the top-most probe cover 30a. while assisting in retaining the adjacent probe cover 30b within the storage container 58. In an exemplary embodiment, the storage container 58 may further include one or more tabs, shoulders, and/or other like features (not shown) extending from one or more surfaces of the storage container 58 to assist in retaining the adjacent probe cover 30b during removal of the top-most probe cover 30a.

As shown in FIG. 2, the storage container 58 may, for example, define a front 66, a back 68, and at least two sides 70, 72. In additional exemplary embodiments, the storage container 58 may include additional sides and/or other structures depending upon, for example, the configuration of the probe covers 30 and/or storage requirements related to the probe covers 30. As shown in FIG. 2, an exemplary storage container 58 may also include a top 62, and a bottom 64 disposed opposite the top 62. In an exemplary embodiment, the top 62 may define at least a portion of the opening 60. In additional exemplary embodiments, at least a portion of the top 62 may be removed to expose the opening 60, and in further exemplary embodiments, substantially the entire top 62 may be removed from the storage container 58. Alternatively, and/or in addition, one or more of the front 66, back 68, and sides 70, 72, or a portion thereof, may be folded and/or removed to expose the opening 60.

As shown in FIG. 3, two or more stacked probe covers 30a, 30b may be substantially aligned along respective longitudinal axes thereof within the storage container 58. In such exemplary embodiments, a plurality of probe covers 30 may be supported by, for example, the bottom 64 of the storage container 58. For example, the distal end 40 of a bottom-most probe cover 30j may be disposed in contact with the bottom 64, and adjacent probe covers 30 may be stacked on top of one another such that a rib, tab, flange, or other structure of the top-most probe cover 30a lies in contact with a corresponding structure of the adjacent probe cover 30b.

The storage container 58 may include one or more information features 28 configured to provide information to the sensor 34. In an exemplary embodiment in which the sensor 34 comprises a reader, the sensor 34 may be configured to read information from the information feature 28, and send a signal to the controller 54 indicative of the information. For example, as shown in FIG. 2, the reader may pass proximate to the information feature 28 to read the information while the head 18 and/or other portion of the temperature probe 10 passes through the opening 60. Alternatively, as shown in FIG. 4, in exemplary embodiments in which the reader is disposed on the receptacle 80, the information feature 28 may pass proximate to the reader during insertion in and/or removal from the receptacle 80. In such an exemplary embodiment, the reader may read the information during at least one of, for example, insertion of the storage container 58 into the receptacle 80 and removal of the temperature probe 10 from the receptacle 80.

The information feature 28 may provide any relevant information related to the probe covers 30, the temperature probe 10, and/or the storage container 58. For example, the information may comprise thickness, transmissivity, material composition, manufacture date, lot number, manufacture location, manufacturer name, probe cover type, intended body site, and/or other information associated with each individual probe cover 30 disposed within the storage container 58. In another exemplary embodiment, the information may comprise, an average thickness, an average transmissivity, and/or other average values corresponding to the plurality of probe covers 30 stored within the storage container 58. In still a further exemplary embodiment, the information may comprise average thickness, average transmissivity, material composition, manufacture date, lot number, manufacture location, probe cover type, intended body site, and/or other information corresponding to the lot of probe covers from which the plurality of probe cover 30 disposed within the storage container 58 have been obtained. Such exemplary information may also include a range of tolerances corresponding to each value.

The information feature 28 may be positioned at any desirable location on the storage container 58 to facilitate reading of the information by the sensor 34. For example, the information feature 28 may be positioned on the front 66, back 68, one of the sides 70, 72, and/or any other surface of the storage container 58. The information feature 28 may be disposed proximate the opening 60 such that the sensor 34 may read information provided by the information feature 58 as the head 18 of the temperature probe 10 is passed through the opening 60 for mounting a probe cover 30 thereon. Alternatively, as shown in FIG. 4, the information feature 28 may be appropriately located and/or positioned on a surface of the storage container 58 such that the information feature 28 will be disposed proximate and/or substantially adjacent to the sensor 34 when the storage container 58 is disposed within the receptacle 80.

The information feature 28 may comprise, for example, a label, tag, patch, and/or any other like structure attached to the storage container 58 during the manufacturing process. In such embodiments, the information feature 28 may be attached to the storage container 58 with adhesives and/or any other like means. Alternatively, the information feature 58 may be printed directly onto the storage container 58 and/or otherwise formed integrally with the storage container 58. As described above, in exemplary embodiments, the information feature 28 may comprise one or more of an RFID tag, a barcode, MICR printing, a conductive, resistive, and/or magnetic piece of material, and/or any other like device useful in providing information readable by the sensor 34.

In still further exemplary embodiments, an information feature 28 may be disposed on a surface of each individual probe cover 30. In such exemplary embodiments, the information feature 28 may be etched, molded, and/or otherwise formed integrally with the probe cover 30 during the probe cover manufacturing process. Alternatively, such information features 28 may be adhered, printed, and/or otherwise disposed on each probe cover 30 by other known means or methods. In such exemplary embodiments, the sensor 34 may be disposed at any convenient location on the temperature probe 10 to facilitate reading of the information. For example, in such embodiments, the sensor 34 may be disposed on, in, and/or proximate the head 18. In further exemplary embodiments, the sensor 34 may be disposed proximate the tip 16 to facilitate reading the information.

The temperature probes 10, probe covers 30, receptacles 80, and storage containers 58 described herein may be utilized by physicians, nurses, and/or other health care professionals in a variety of different environments. For example, the devices and/or the temperature measurement systems described herein may be employed in any of a number of examination facilities to determine one or more temperatures associated with a patient such as, for example, an estimated core temperature of the patient. Such an estimated core temperature may be utilized by the health care professional to assist in treating the patient, and may have a variety of uses that are well known in the medical field.

In order to determine a patient temperature according to an exemplary embodiment of the present disclosure, a user of the temperature probe 10 may insert the temperature probe 10 into a probe cover 30. For example, the user may insert at least a portion of the temperature probe 30 such as, for example, the head 18 into the probe cover 30, via the orifice 46. In an exemplary embodiment, the probe cover 30 may be disposed within the storage container 58 while the head 18 of the temperature probe 10 is inserted into the probe cover 30. In such an exemplary embodiment, the probe cover 30 may be accessed through the opening 60 of the storage container 58 for insertion of the head 18. As shown in FIG. 3, the temperature probe 10 may be moved in the direction of arrow 50 relative to the probe cover 30 for insertion.

As one or more of the ejector mechanisms 26 come into contact with the probe cover 30, one or more such ejector mechanisms 26 may hook, clip, and/or otherwise mate with the proximal end 42 of the probe cover 30 to assist in retaining the probe cover 30 on the head 18. In exemplary embodiments in which the proximal end 42 of the probe cover 30 defines one or more of the notches, cutouts, and/or other retention components described above configured to mate with such ejector mechanisms 26, these components may communicate with the corresponding ejector mechanisms 26 of the temperature probe 10 to assist in retaining the probe cover 30 thereon.

Once the probe cover 30 has been connected to the temperature probe 10, one or more of the sensors 32, 34 may be activated and/or otherwise controlled to begin sensing. For example, connecting the probe cover 30 to the temperature probe 10 may activate the sensor 34 to begin sensing and/or otherwise reading information positioned within a sensing range 74 of the sensor 34. The sensing range 74 of the sensor 34 may be an area or zone within which the sensor 34 may be capable of reading information. Such a sensing range 74 may be widened and/or narrowed by adjusting the sensor 34 and/or a lens or other optical component associated with the sensor 34 or the receptacle 80. In an exemplary embodiment, such a sensing range 74 may be substantially conical, and may extend transverse from the sensor 34 for approximately one to two feet. Objects within the sensing range 74 of the sensor 34 may be read by the sensor 34 while objects disposed outside of the sensing range 74 may not be read. In an exemplary embodiment, at least a portion of the storage container 58 and its components may be disposed within the sensing range 74 of the sensor 34 as the head 18 is placed in contact with the top-most probe cover 30a for mounting. Accordingly, connecting a probe cover 30 to the temperature probe 10 may activate the sensor 34, and the sensor 34 may read information provided by the information feature 28 substantially simultaneously with connection of the probe cover 30. In exemplary embodiments, the information feature 28 may be positioned at a location on the storage container 58 that is within the sensing range 74 of the sensor 34, but outside of an analogous sensing range (not shown) of the sensor 32, while the head 18 and/or other portion of the temperature probe 10 is inserted within the probe cover 30.

As described above with respect to FIG. 4, in still further exemplary embodiments, at least a portion of the storage container 58 and its components may be disposed within the sensing range 74 of the sensor 34 upon insertion of the storage container 58 within the receptacle 80. Accordingly, inserting the storage container 58 into the receptacle 80, and/or connecting a probe cover 30 to the temperature probe 10 while the storage container 58 is disposed within the receptacle 80 may activate the sensor 34. In such an exemplary embodiment, the sensor 34 may read information provided by the information feature 28 substantially simultaneously with insertion of the storage container 58 within the receptacle 80 and/or with connection of the probe cover 30. As described above, one or more proximity sensors associated with the sensor 34, the temperature probe 10, the receptacle 80, and/or the controller 52 may trigger reading of the information by the sensor 34.

Upon reading the information provided by the information feature 58, the sensor 34 may send one or more signals to the controller 52 indicative of the information. The controller 52 may process the signals, and may control operation of the temperature probe 10 in response to the information read by the sensor 34. For example, the controller 52 may identify the storage container 58 and/or the probe covers 30 stored therein, based on the information. The controller 52 may activate the sensor 32 in response to such identification if the storage container 58 and/or its probe covers 30 are identified as being products of an acceptable manufacturer. Such a manufacturer may be, for example, the same manufacturer as the temperature probe 10 or an approved licensee of the temperature probe manufacturer. A list of such acceptable manufacturers may be stored within a memory of the controller 52, and the controller 52 may determine whether the storage container 58 and/or the probe covers 30 are products of an acceptable manufacturer by comparing the information read by the sensor 34 to the list. In addition, the controller 52 may disable the temperature probe 10 and/or one or more of its components in response to the information. For example, the controller 52 may disable the temperature probe 10 if no information is read in conjunction with mounting a probe cover 30 on the head 18, or in response to determining that the probe cover 30 mounted on the head 18 is not a product of an acceptable manufacturer.

In additional exemplary embodiments, the controller 52 may record and/or otherwise store information read by the sensor 34. For example, the controller 52 may identify the storage container 58 as containing probe covers 30 produced by an acceptable manufacturer, and may record a cumulative number of probe covers 30 used from the identified storage container 58. In this way, the controller 52 may keep a running tally of the number of probe covers 30 withdrawn from the storage container 58. The controller 52 may disable the temperature probe 10 for subsequent temperature measurements utilizing probe covers 30 from the identified storage container 58 in response to the cumulative number of probe covers 30 meeting a probe cover capacity associated with the storage container 58. In such exemplary embodiments, the controller 52 may prohibit use of probe covers 30 disposed within a storage container 58 of an acceptable manufacturer, but that may not have been produced by the acceptable manufacturer. Instead, once the cumulative number of probe covers 30 associated with the identified storage container 58 meets the probe cover capacity of the storage container 58, the controller 52 may prohibit use of additional probe covers 30 stored in and/or otherwise associated with the identified storage container 58.

In further exemplary embodiments, information collected regarding the number of probe covers 30 used may be used to manage inventory levels. For example, the cumulative number of probe covers 30 described above may be used to manage inventory levels within an organization such as a hospital, a physician's office, a clinic, and/or any other healthcare facility. In such embodiments, one or more temperature probes 10 and/or their respective controllers 52 may be in communication with a server, a wireless network, and/or other like devices at the healthcare facility. The one or more temperature probes 10 may continuously update the facility device with the cumulative number of probe covers 30 used. The server and/or other facility device may, in turn, keep a running tally of the total number of probe covers 30 used by the temperature probes 10 throughout the facility. When the tally of the total number of probe covers 30 used reaches an inventory threshold, the facility device may alert a facility employee that additional probe covers 30 should be ordered to replenish the facility's inventory. Alternatively, the facility device may automatically place an order for such additional probe covers in response to the threshold being reached.

In addition, as described above, each of the probe covers 30 disposed within the storage container 58 may be characterized by at least one unique thickness, transmissivity, and/or other physical property value. In exemplary embodiments, the information provided by the information feature 28 may comprise averages of each respective unique property value associated with the probe covers 30 disposed within the storage container 58, or with the lot of probe covers from which the probe covers 30 disposed within the storage container 58 were obtained. In such exemplary embodiments, a core temperature of a patient may be estimated and/or otherwise calculated based on the information. In particular, as will be described in greater detail below, the information may be utilized as an input to one or more temperature calculation algorithms employed by the controller 52 to estimate a core temperature of the patient.

Once the probe cover 30 has been mounted onto the head 18 of the temperature probe 10, the head 18 and the probe cover 30 may be removed from the storage container 58 in the direction of arrow 76 (FIG. 2), and may be inserted into a body cavity of a patient to facilitate determining an estimated core temperature of the patient. For example, while within the body cavity, the sensor 32 may sense a temperature indicative of a temperature of the body cavity. For example, in an embodiment in which the first sensor 32 comprises a thermocouple and/or a thermistor, the first sensor 32 may be utilized to measure the temperature of the body cavity.

Signals indicative of the measured temperature may be sent to the controller 52 by the sensor 32, and the controller 52 may assist in estimating the core temperature based on the sensed temperature and the information read from the information feature 28. For example, the average thickness, average transmissivity, and/or other physical property values of the probe covers 30 contained within the storage container 58, or their corresponding lot, may be utilized in the core temperature calculation to reduce error. Such error is commonly caused by mistakenly assuming that the probe cover 30 being utilized has thickness, transmissivity, and/or other physical property values substantially equal to nominal or requested physical property values associated with the manufacturing process when, in fact, the actual thickness, transmissivity, and/or other physical property values of the probe cover 30 may be substantially different than such nominal values. Such differences may result from, for example, variations inherent in the manufacturing process.

For example, if the actual probe cover 30 being used during the body cavity temperature measurement has a greater thickness and/or a lower transmissivity than the nominal thickness and/or transmissivity values requested from the probe cover manufacturer, the temperature measurement obtained by the sensor 32 may be artificially lower than the actual temperature of the body cavity. Accordingly, an exemplary algorithm of the present disclosure may incorporate the information read from the information feature 28 into the core temperature calculation to reduce error resulting from probe cover manufacturing variations. In the above example, the algorithm may increase the estimated core temperature in response to the thickness and/or transmissivity information. In additional exemplary embodiments, on the other hand, the algorithm may decrease the estimated core temperature as necessary based on the information provided by the information feature 28. Once the estimated core temperature of the patient has been calculated by the controller 52, the display 54 may communicate the temperature to a user of the temperature probe 10.

Additional exemplary embodiments of the present disclosure may employ further techniques to assist in reducing the error associated with calculating the core temperature of the patient. For example, one such method of core temperature determination may include heating at least a portion of the temperature probe 10 to a known temperature, and calculating the core temperature based on the sensed temperature described above, the information provided by the information feature 28, as well as the known temperature. In exemplary embodiments, the known temperature to which a portion of the temperature probe 10 may be heated may be between approximately 90° F. and approximately 100° F. For example, the known temperature may be between approximately 92° F. and approximately 93° F., and/or within any other useful temperature range. It is understood that one or more heaters (not shown) may be utilized to assist in heating the portion of the temperature probe 10 to this known temperature.

In still further exemplary embodiments, one or more additional sensors (not shown) may be disposed on the temperature probe 10 at a location useful for detecting the presence of the probe cover 30. For example, such additional sensors may be disposed proximate the base 24 of the head 18 and configured to detect the proximal end 42 of the probe cover 30 once the head 18 has been inserted into the probe cover 30. In still further exemplary embodiments, such sensors 28 may be disposed proximate the tip 16 and configured to detect the distal end 40 of the probe cover 30 once the head 18 has been inserted into the probe cover 30. In such exemplary embodiments, the one or more additional sensors may comprise, for example, a proximity sensor and/or any other like sensing device, and sensing the temperature indicative of the body cavity temperature may be performed in response to detecting the presence of the probe cover 30 on the head 18.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of determining a temperature of a patient, comprising:
    reading information related to a plurality of probe covers stored within a container with a reader, wherein
        at least one probe cover of the plurality of probe covers contacts a bottom surface of the container, and
        at least a portion of the container is removably retained within a compartment of a receptacle, the receptacle being separate from the container;
    mounting a probe cover of the plurality of probe covers onto a temperature probe while the probe cover is disposed substantially within the container;
    measuring a temperature of the patient with a temperature sensor of the temperature probe; and
    estimating a core temperature of the patient based on the measured temperature and the information, wherein the reader comprises a reading device separate from the temperature sensor.

2. The method of claim 1, wherein mounting the probe cover comprises inserting a portion of the temperature probe within the probe cover such that the reader remains exposed outside of the probe cover, the information being read from an information feature disposed on the container.

3. The method of claim 1, further comprising disabling the temperature probe in response to the information.

4. The method of claim 1, further comprising identifying the container with the reader and recording a cumulative number of probe covers used from the container.

5. The method of claim 4, further comprising disabling the temperature probe for subsequent temperature measurements utilizing probe covers from the container in response to the cumulative number meeting a probe cover capacity associated with the container.

6. The method of claim 1, wherein each probe cover of the plurality of probe covers is characterized by a unique value indicative of a physical property of the respective probe cover, the information comprising an average of the unique values.

7. The method of claim 6, wherein the physical property comprises one of a thickness and a transmissivity.

8. The method of claim 1, further comprising:
    determining, with an electronic control device in communication with the reader and based on the information, that the probe cover is a product of an acceptable manufacturer; and
    activating, with the electronic control device, an additional component of the temperature probe in response to determining that that the probe cover is the product of the acceptable manufacturer.

9. A system, comprising:
    a temperature probe including a temperature sensor;
    a reading device;
    an electronic control device in communication with the temperature sensor and the reading device; and
    a receptacle including a compartment, wherein:
        the receptacle is configured to removably retain a container within the compartment, the container storing a plurality of probe covers and including an information feature providing information related to the plurality of probe covers,
        the reading device is configured to read the information from the information feature during at least one of insertion of the temperature probe into a probe cover of the plurality of probe covers, and insertion of the container within the compartment, and
        the electronic control device is configured to estimate core temperature of a patient based on a temperature measured by the temperature sensor and the information read by the reading device.

10. The system of claim 9, further comprising memory in communication with the electronic control device, the memory including one of pattern recognition software and identification software, wherein the electronic control device employs the one of pattern recognition software and identification software to assist the reading device in reading the information provided by the information feature.

11. The system of claim 9, wherein the electronic control device is configured to determine whether at least one of the container and the plurality of probe covers is a product of an acceptable manufacturer based on the information, and to disable the temperature probe in response to determining that the at least one of the container and the plurality of probe covers is not a product of the acceptable manufacturer.

12. The system of claim 9, wherein the information is indicative of at least one of a thickness, a transmissivity, a material composition, a manufacture date, a lot number, a manufacture location, a manufacturer name, and a probe cover type.

13. The system of claim 9, wherein the reading device comprises one of an RFID reader, a barcode reader, an MCIR reader, a conductance sensor, a resistance sensor, and a magnetic sensor, and
    wherein the information feature comprises one of an RFID tag, a barcode, MCIR printing, a conductive strip of material, a resistive strip of material, and a magnetic strip of material.

14. The system of claim 9, wherein the temperature sensor is in communication with the electronic control device via a wireless connection.

15. A system, comprising:
    a reader;
    an electronic control device in communication with the reader; and
    a receptacle including a compartment, wherein:
        the receptacle is configured to removably retain a container within the compartment, the container storing a plurality of probe covers and including an information feature providing information related to the plurality of probe covers, at least one probe cover of the plurality of probe covers contacting a bottom surface of the container,
        the reader is configured to read the information from the information feature when the information feature is disposed within a sensing range of the reader, and to provide a signal to the electronic control device indicative of the information, and the electronic control device is configured to estimate core temperature of a patient based on the information read by the reader, and on additional information received by the electronic control device indicative of a measured temperature.

16. The system of claim 15, further comprising a temperature sensor in communication with the electronic control device, the temperature sensor being configured to determine the measured temperature, and provide the additional information to the electronic control device.

17. The system of claim 15, wherein the reader comprises a camera, and wherein the electronic control device employs one of pattern recognition software and identification software to assist in reading the information provided by the information feature.

18. The system of claim 15, further comprising a proximity sensor in communication with the electronic control device, the electronic control device being configured to activate the reader in response to a signal received from the proximity sensor.

19. The system of claim 15, wherein the electronic control device is configured to activate the reader in response to the a least one probe cover being connected to a temperature probe such that the reader reads the information from the information feature substantially simultaneously with connection of the at least one probe cover to the temperature probe.

20. The system of claim 15, further comprising an optical component associated with the reader and configured to widen or narrow the sensing range of the reader.

* * * * *